United States Patent Office 2,890,387
Patented June 9, 1959

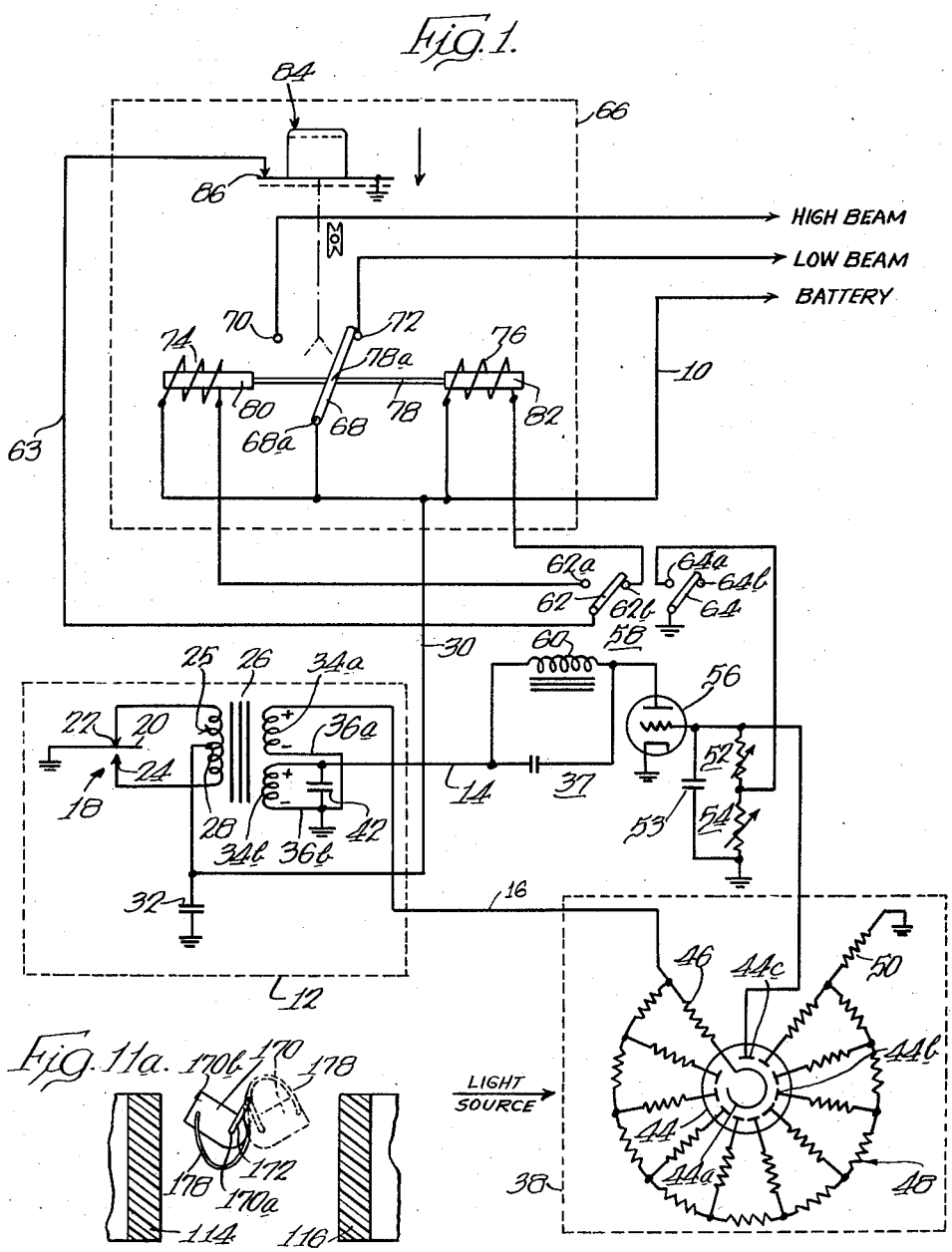
Fig. 1.
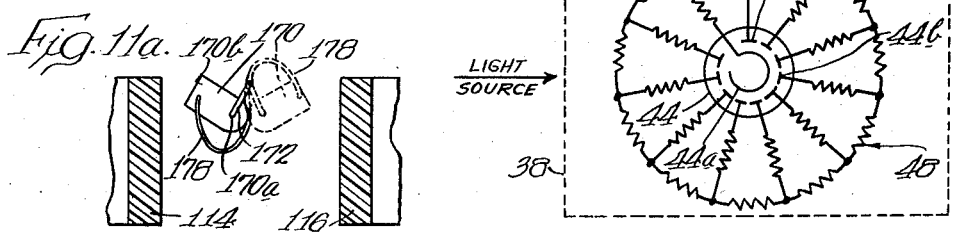
Fig. 11a.
Fig. 11b.
INVENTORS
Verlis H. Wiley
John P. Rug
Lloyd S. Trefethen
By: Mason, Kolehmainen, Rathburn & Wyss
Attys

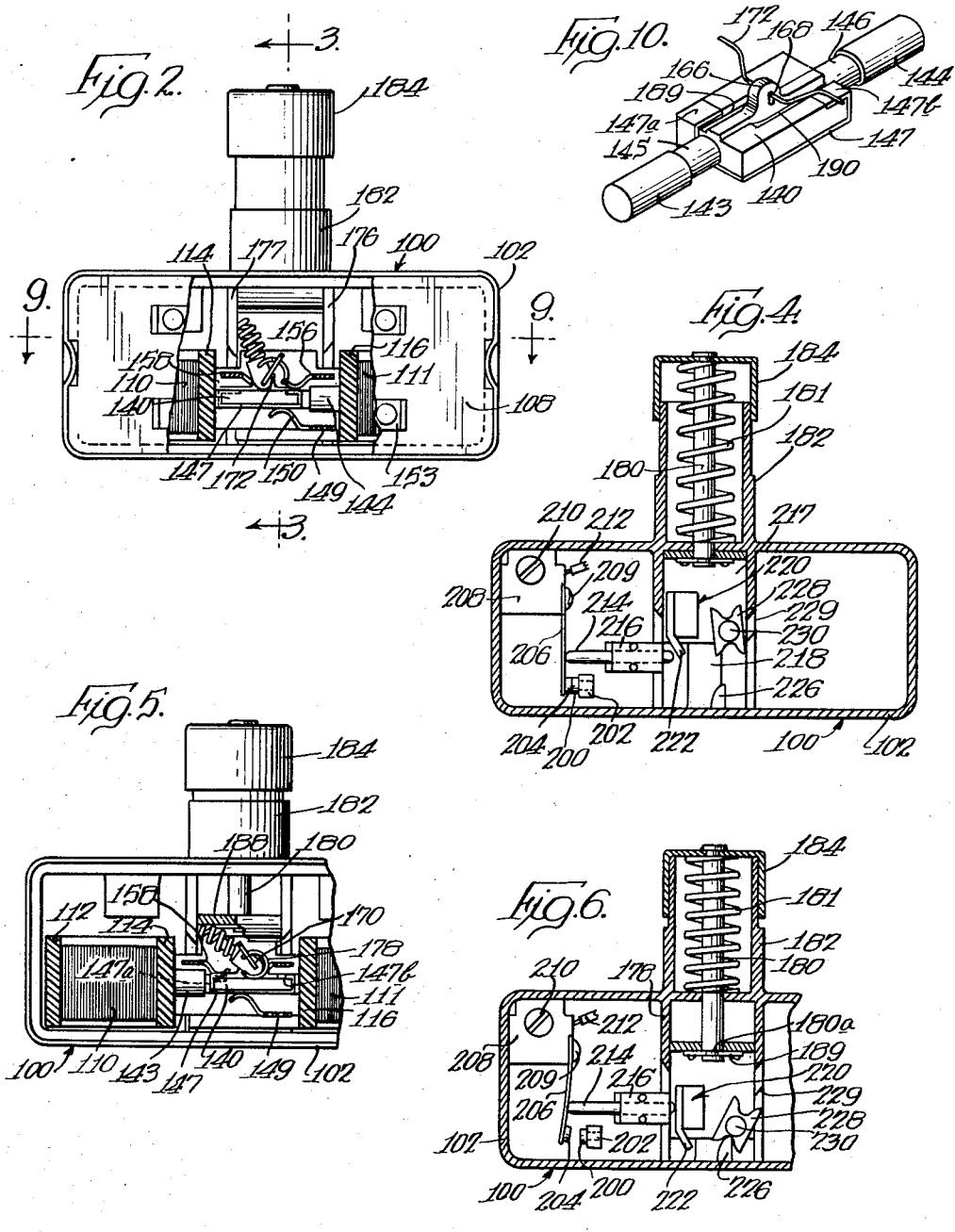

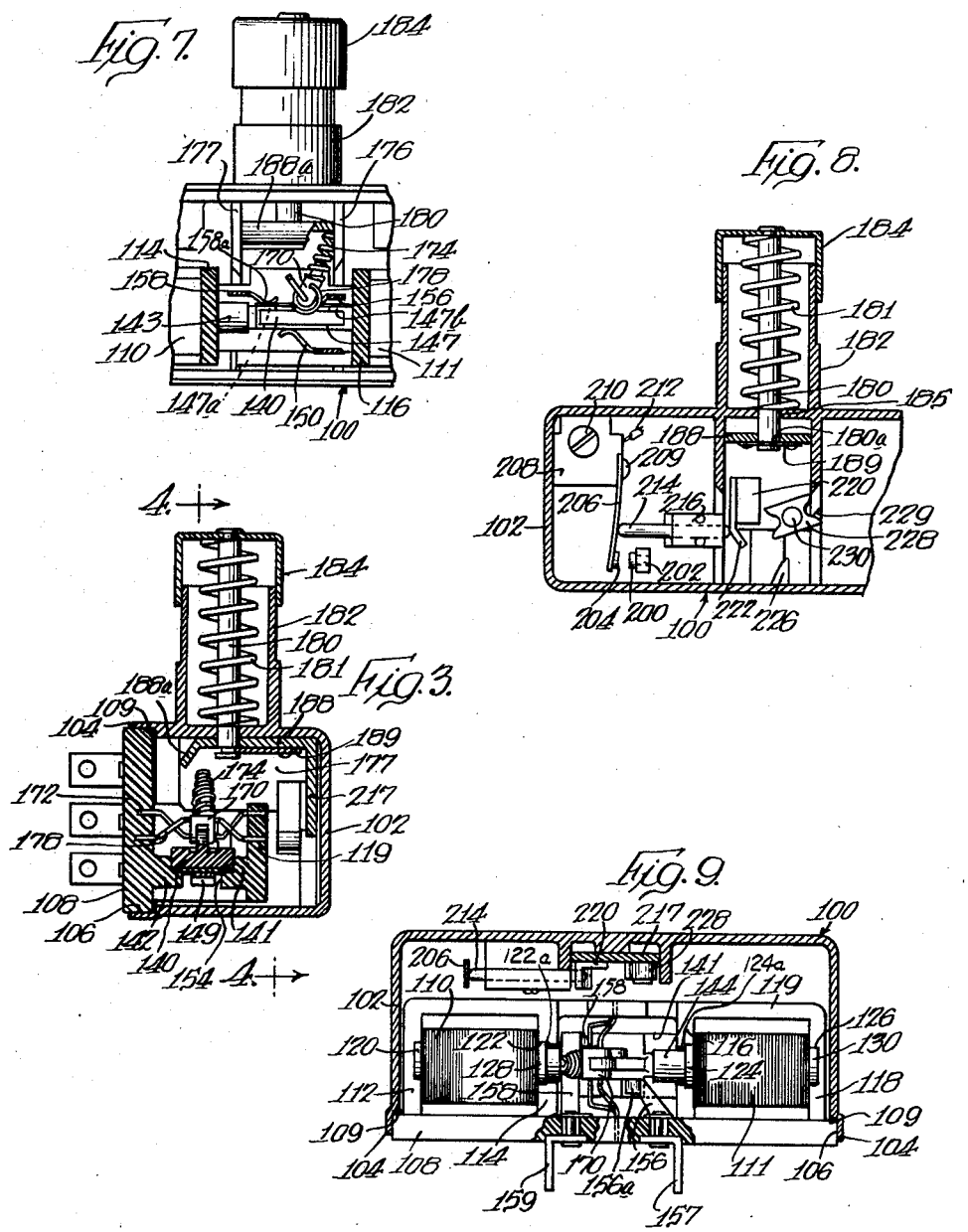

2,890,387

AUTOMOBILE HEADLIGHT CONTROL SYSTEM

Verlis H. Wiley, Kenmore, John P. Rug, Buffalo, and Lloyd S. Trefethen, Eggertsville, N.Y., assignors, by mesne assignments, to Sylvania Electric Products Inc., Wilmington, Del., a corporation of Delaware Application January 18, 1955, Serial No. 482,489

3 Claims. (Cl. 315—83)

The present invention relates to motor vehicle headlight control systems, more particularly to control systems for automatically dimming the headlights of automobiles or the like, and the invention has for an object the provision of a headlight control system and switching apparatus for use therein which causes the headlight beams to be automatically lowered upon the approach of an oncoming vehicle.

Numerous control systems and apparatus for use therein are known in the prior art for electronically and electro-mechanically selecting one of the beams of multi-beam headlights of automotive vehicles to automatically depress the maximum range beams of such headlights or to otherwise reduce the light intensity therefrom when two or more automotive vehicles approach one another in such a manner that the bright lights therefrom might temporarily blind the respective automotive vehicle operators to thereby create a dangerous driving hazard. Although such automatic systems generally function satisfactorily to automatically dim the headlamps to obviate such driving hazards, like all automatic systems, they are subject to failure. In the event that the automatic headlight control system should fail, it is desirable, if not altogether necessary, that the driver of the vehicle have manual control of the multi-range headlights. Otherwise, the operation of the vehicle on the highway would be a constant source of danger. Furthermore, circumstances frequently exist where it is desirable for the driver to be able to quickly over-ride the automatic system, even when it is operating satisfactorily.

Another object of the present invention is, therefore, to provide a new and improved automatic control system for use with headlight beams of an automotive vehicle, and which permits the operator of the vehicle to control the headlights manually if desired, this manual control being available instantly in the case of emergency, irrespective of the condition of the automatic system.

Another object of the present invention is to provide a new and improved automatic headlight dimmer having means manually operable at all times to overrule the automatic mechanism.

A further object of the present invention is to provide a new and improved automotive vehicle headlight dimmer utilizing a single actuating member for overrulling the automatic system and for depressing or raising the beams of multirange headlights.

A still further object of the present invention is to provide a new and improved automotive headlight control system which enables the driver of the vehicle to overrule the automatic system and to manually switch the headlight beams by means of a single actuation of a plunger operated switch.

A still further object of the present invention is to provide a new and improved automatic headlight control system wherein the response time of the headlight beam condition to change in lighting conditions is extremely rapid.

Briefly, in accordance with the present invention there is provided a system for automatically dimming the headlights of an automotive vehicle in response to light energy from an approaching vehicle impinging upon a light sensitive device and for quickly restoring the headlights to the high beam condition when the approaching vehicle has passed. A manually operable switch is provided for overriding the automatic system to reverse the position of the headlight beams and is so connected in circuit with the automatic system such that the system is alternately switched between automatic and manual operation in response to successive actuations of the manually operable switch actuating member.

The invention, both as to its organization and method of operation, together with further objects and advantages thereof, will best be understood by reference to the following detailed description taken in connection with the accompanying drawings, in which:

Fig. 1 is a schematic, somewhat diagrammatic, circuit diagram of a preferred embodiment of one phase of the present invention showing an automatic headlight control system;

Fig. 2 is a partial sectional front elevation view of a preferred embodiment of another phase of the present invention showing improved switching apparatus which finds particular application in the headlight control system of Fig. 1;

Fig. 3 is a sectional side elevation view taken along the line 3—3 in Fig. 2;

Fig. 4 is a front elevation sectional view taken along the line 4—4 in Fig. 3, assuming the entire switching mechanism is shown therein;

Fig. 5 is a fragmentary sectional view of the switching apparatus of Fig. 2 showing the manually operable switch actuating member in the depressed position;

Fig. 6 is a fragmentary sectional view of the switching apparatus of Fig. 2 taken along line 4—4 of Fig. 3 showing the manually operable actuating member in the depressed position;

Fig. 7 is a fragmentary sectional view similar to Fig. 2 in which the switching mechanism shown is in a different position of operation;

Fig. 8 is a fragmentary sectional view similar to that of Fig. 6 showing the switch in the manual operating condition;

Fig. 9 is a top elevation sectional view taken along the line 9—9 in Fig. 2;

Fig. 10 is a perspective view of a slidable support member; and

Figs. 11a and 11b are diagrammatic illustrations of the over-center spring and toggle arrangement.

Before considering the detailed aspects of the present invention as illustrated in the several figures of the drawings, it should be pointed out that automatic headlight control systems are relatively new whereas manually controlled systems for selectively switching the means of multi-beam headlights have been widely known and used for many years. Because of this familiarity gained through many years of use, the average motorist instinctively actuates the conventional foot operated plunger type of headlight control switch when there arises an emergency condition which dictates that his headlight beam should be either depressed or raised.

In view of this, the present invention incorporates the conventional foot-operated plunger in a headlight switching apparatus control whereby the driver of the automotive vehicle is able to instinctively take control of the position of his headlight beams without any consideration whatsoever to the condition of the automatic control mechanism. If, for example, the motor vehicle operator sees that his headlight beams are switched in one position and he desires that they be in the other position, he merely depresses the conventional foot-operated plunger to quickly and positively switch the headlight beams to the desired position. Furthermore, the manually controlled switching apparatus is equally effective to change the position of the beams whether or not the automatic control system is operating satisfactorily. Upon the termination of the emergency condition which induced the driver to switch the system to the manually operable position, another similar actuation of the foot-operated plunger automatically returns the system to automatic operation and at the same time switches the headlights to the other beam position.

Another point which must be considered in the design, and manufacture of automatic headlight beam control systems, is the rapidity with which the beams are returned to the high beam condition after the approaching vehicle has passed. It has been suggested to incorporate time delay apparatus in headlight control systems to prevent return of the system to the high beam condition when the vehicle incorporating the automatic equipment passes over bumps in the road or makes a sharp turn to avoid an obstruction such, for example, as a hole in the road. Furthermore, the systems as taught by the prior art are inherently slow acting unless special, usually expensive, provisions are made to decrease the response time.

While holes and bumps in present day highways are quite uncommon, it is not unusual for an automotive vehicle to pass a single approaching vehicle on a dark, winding, country road. In the latter case it is very important that the headlights be returned to the high beam condition as soon as possible to prevent overdriving of the headlights and the consequent dangerous driving hazard.

A preferred embodiment of the present invention for effecting the aforesaid results, generally includes a vibrator for converting the direct voltage of the conventional automobile battery into an alternating voltage for the energization of an electronic control circuit which includes a light sensitive element for producing a voltage having a magnitude responsive to the intensity of light impinging thereon, and a discharge device connected in a novel circuit arrangement for amplifying this voltage to control the operation of a switching relay. The switching relay selectively controls a solenoid operated headlight beam control switch to connect either the high or low beam filaments of the automobile headlights to the automobile battery for energization thereby.

In order to enable the driver to take control of the headlights when an emergency condition arises, the solenoid operated beam control switch is provided with the conventional foot-operated plunger, the actuation of which, overrules the controlling solenoids therein to place the switch in the other operating position and to change the system to the manually operating condition.

Referring now to the drawings and particulary to Fig. 1, wherein a headlight control system includes a conductor 10 adapted to be connected to one terminal of a conventional automotive vehicle battery to provide a source of power energization for a conventional vibrator circuit 12 which provides alternating operating voltages on the conductors 14 and 16. Specifically, the vibrator 12 includes a vibrating element 18 having a magnetically movable center contact member 20 connected to ground. Stationary contact members 22 and 24 are respectively connected to the ends of an inductor 25 which forms the primary winding of a transformer 26. The inductor 25 is connected to be supplied at the center tap 28 thereof with direct voltage energy from the battery through the conductors 10 and 30. A bypass capacitor 32 is connected between tap 28 and ground to bypass any radio frequency waves generated in the vibrator which might interfere with the operation of a radio receiver in the motor vehicle. A pair of secondary windings 34a and 34b are provided on the transformer 26 and adapted to be energized by the magnetic field established by current in either half of the inductor 25. One end of each of the secondary windings 34a and 34b are connected to ground through a pair of conductors, 36a and 36b, respectively, and the other ends are respectively connected through the conductors 14 and 16 to an amplifier and relay circuit 37 and to a conventional light sensitive device 38. A buffer capacitor 42 is connected across the secondary winding 34b and is used to tune out transients generated in the vibrator thereby to provide a substantially square waveform of voltage on the conductor 14.

The light sensitive device 38, which is preferably mounted at the foot of the motor vehicle so as to be energized by that light which would ordinarily interfere with the safe operation of the motor vehicle by temporarily blinding the driver thereof, may conveniently include a conventional photo-multiplier discharge device 44 having a cathode 44a connected through a resistor 46 to the conductor 16 for energization by the alternating voltage provided thereon from the vibrator assembly 12. A plurality of multiplier electrodes 44b are connected through a conventional resistor network 48 and a resistor 50 to ground so as to provide at an anode 44c of the discharge device 44 a voltage indicative of the amount of light impinging on the cathode 44a. The anode 44c is connected to supply current to a pair of variable grid resistors 52 and 54 of an electron discharge device amplifier 56 to effect energization of a switching relay 58 in response to the light impinging on the device 38. In order to smooth out the peaks in the A.-C. signal supplied to the control electrode of the amplifier 56, a capacitor 53 is connected in parallel with the grid resistors 52 and 54. The resistive network 48 is provided in connection with the photomultiplier 44 in place of the conventional multi-tap transformer to permit the use of a more compact light sensitive device without the necessity of connecting a multiplicity of conductors thereto.

The relay 58 includes an energizing coil 60 which is connected between the conductor 14 and the anode of the device 56, a pair of shunting members 62 and 64, and contacts 62a, 62b, 64a and 64b. When the coil 60 is energized the shunt 64 is positioned so as to connect the contact 64a to ground, and the shunt 62 is positioned so as to connect the contact 62a with a conductor 63. When the coil 60 is deenergized (the position shown) shunt 64 is disconnected from the circuit and shunt 62 interconnects contact 62b with the conductor 63.

The system as thus far described is operable to selectively connect the contact 62a or the contact 62b to conductor 63 in response to the lighting condition affecting the light sensitive device 38. In order to control the headlight beams of the automotive vehicle in accordance with the lighting condition as evidenced by the position of the shunt 62 of the switching relay 58, a combination solenoid or manually operated switching apparatus 66 is connected to one side of the vehicle battery through the conductor 10 and to the other side of the battery through the section 62 of the switching relay 58, the latter side including the vehicle ground system.

The switch 66 is provided with a shunt 68 adapted to selectively connect the conductor 10 to the central contact 70 which is connected to the high beam filaments or to the central contact 72 which is connected to one side of the low beam filaments, the other side of the filaments being grounded. Thus, when the shunt 68 interconnects the conductor 10 and the contact 70, the high beams are energized, whereas when the shunt 68 interconnects the conductor 10 and the contact 72, the low beams are energized.

In order to automatically control the position of the shunt 68, a pair of control solenoids 74 and 76 are connected to be selectively energized in accordance with the condition of the switching relay 58. In the diagrammatic illustration of switch 66 as illustrated in Fig. 1, the shunting member 68 is pivotally mounted at the point 68a for rotation thereabout in response to lateral movement of the rod 78 which is loosely and pivotally attached to the shunt 68 at the point 78a intermediate the ends thereof. A pair of magnetic cores 80 and 82 are attached to opposite ends of the rod 78 and adapted to be moved laterally in response to energization of one or the other of the solenoids 74, 76. Accordingly, when the solenoid 74 is energized, the core 80 is drawn therein, laterally moving the rod 78 to the left to energize high beam filaments. Conversely, when the solenoid 76 is energized, the core 82 is drawn therein, laterally moving the rod 78 to the right to energize the low beam filaments.

Manual overruling of the automatic control system is provided by means of a plunger operated actuating member 84 which is adapted to move the shunt 68 to the unoccupied control contact, 70 or 72. In order to facilitate actuation of the plunger 84, a switch 86 which is connected in the ground return path of the control solenoids 74 and 76 between conductor 63 and ground is adapted to be alternately opened and closed in response to successive actuations of the plunger 84 and is so actuated thereby as to open the ground path of the solenoids prior to the actual physical moving of the shunt 68 by the mechanical actuating member. Whereas one phase of the present invention teaches a particular construction for the control switch 66, other constructions may, of course, be utilized in the system illustrated in Fig. 1. For example, a ratchet type switch 86 may be employed to open and close the solenoid ground return path in response to successive actuations of the plunger 84.

The operation of the control system as illustrated in Fig. 1 will now be described. The switch 86 being closed, the system is in the automatic condition with the solenoid 76 energized so as to connect the low beam filaments in circuit with the battery. Consequently, it may be assumed that another vehicle is approaching such that a sufficient amount of light is impinging upon the cathode 44a of the photoelectric multiplier tube 44 to effect a high current between the cathode 44a and the anode 44c which establishes a negative bias across the resistors 52 and 54 to cut off the discharge device 56. When the device 56 is cut off, the relay coil 60 of the relay 58 is deenergized to move the shunts 62 and 64 in contact with their b contacts. In this position the solenoid 76 is energized through the shunt 62 so as to actuate the switch 66 to connect the conductor 10 with the low beam headlight filaments. When, however, the approaching vehicle has passed such that the incident light on the photoelectric multiplier cathode 44a is diminished, the voltage developed across the resistors 52, 54 is reduced so that the discharge device 56 is rendered conductive and the coil 60 of the relay 58 is energized. When the relay 58 is energized, the junction between the resistors 52 and 54 is connected to ground through the contact 64a and the shunt 64, and the solenoid 74 is energized through the contact 62a and the shunt 62 thereby to energize the high beam filaments. It may be seen, therefore, that when the control switch is in the high beam position the load resistance connected to the anode 44c of the photomultiplier tube 44 is reduced so as to decrease the sensitivity thereof by a factor of approximately two to one. Accordingly, when the relay 58 is deenergized so as to change from high beams to low beams, the sensitivity of the photomultiplier tube 44 is increased immediately after the dimming operation to prevent the reenergization of the high beams when the headlights of the oncoming vehicle are switched from the high beam to the low beam position and the light striking the cathode 44a is correspondingly reduced. When the system is in automatic operation and the shunt member 68 of the switch 66 is in contact with either the high beam contact 70 or the low beam contact 72, actuation of the switch 84 opens the ground circuit to both of the solenoid windings and throws the shunt member 68 to the other contact position. The release of the plunger of the switch 84 does not close the switch 86 and the solenoids remain deenergized. When it then becomes desirable for an operator to utilize the other headlight beams, another actuation and release of the plunger of the switch 84 will once more close the switch 86 thereby completing the circuit between the shunt 62 and ground, whereby the automatic system including the relay 58 and the discharge device 56 takes over control of the headlight beams.

The rapid response of the automatic system is economically obtained by the use of the two secondary windings 34a and 34b on the transformer 26 whereby the anode and control electrode of the discharge device 56 are A.-C. energized by in phase signals. The value of the capacitor 53 is relatively small and is selected to provide satisfactory filtering of the control signal from the photomultiplier 38 without introducing any appreciable time delay into the overall control system.

Referring to Figs. 2 through 10, there is shown therein a headlight control switch 100 including a housing comprising an integral body portion 102 and a cover member 108 adapted to be received within a rabbit 106, best shown in Figs. 3 and 9, which is provided about the open end of the body portion 102. To provide a relatively dust-free space for housing the principal parts of the switching mechanism, an annular gasket 109 is positioned on the rabbit 106 between the cover 108 and the housing body portion 102.

A pair of control solenoids 110 and 111, which correspond to the solenoids 74 and 76 in Fig. 1, are provided for electromagnetically positioning the contact members of the switch 100 in response to a switching signal supplied thereto from the switching relay 58 of the automatic control circuit of Fig. 1. In order to support the solenoids 110 and 111 within the housing and to permit facile access thereto for both initial assembly and repair, a plurality of integral members 112, 114, 116 and 118 depend from the cover 108 into the housing cavity. A cross-member 119, best shown in Fig. 9, interconnects the inner ends of the depending members 112, 114, 116, 118 for added mechanical strength and to support certain parts of the switch mechanism to be more fully described hereinafter. The solenoids 110, 111 are supported in the outer cavities defined by the depending members 112, 114, 116, 118 and the cross-member 119 by means of slots 120, 122, 124, 126 which are adapted to receive the ends of a pair of sleeves 128 and 130 upon which the coils of solenoids 110, 111 are respectively wound. In order to symmetrically mount the solenoids 110, 111 with respect to the depending members, the sleeve supporting slots 120, 122, 124, 126 are centrally located intermediate the ends of the depending members and extend approximately one-half the distance therethrough parallel with the plane of the housing cover 108. The inner ends of the sleeve supporting slots are arcuate, thereby to loosely conform to the outer surface of the sleeves 128, 130. In order to prevent lateral movement of the solenoid sleeves 128 and 130, the slots 120 and 126 in the outer depending members 112, 118 are slotted recesses not fully extending through the thickness of the depending members and the slots 122, 124 are provided with inwardly extending shoulders 122a and 124a.

In order to selectively connect the automotive vehicle battery which is connected to terminal 153 in circuit with the high or low beam headlight filaments which are respectively connected to terminal lugs 157 and 159 a solenoid controlled slidable contact support member 140 (best shown in Fig. 10) is mounted in a guide channel 141 (Fig. 3) provided in a depending member 142 which extends perpendicularly from the housing cover 108 between the members 114, 116 and orthogonally thereto. The guide channel 141 extends laterally along the longitudinal axis of the solenoids 110, 111 thereby to permit guided movement of the contact support member 140 in response to forces applied thereto along the longitudinal axis of the solenoids 110, 111. To provide such forces in response to control current in one or the other of the solenoids 110, 111 magnetic cores 143 and 144 are mounted along the principal axis of the slidable support 140 on integral extending portions 145 and 146, respectively. The cores 143, 144 are generally cylindrical in shape and positioned so as to be received within the solenoid sleeves 128, 130 and are spaced apart by such an amount such that at any one time only one core can be symmetrically located with respect to a control solenoid. It will thus be seen that energizing of solenoid 110 draws the core 143 within the sleeve 128 thereby moving the slidable support 140 to the left. Conversely, energization of the solenoid 111 moves the support 140 to the right.

A contact member 147, which is formed from a flat sheet of a conductive material, such, for example, as copper, is provided with a pair of rectangularly shaped tabs 147a and 147b extending from two diagonally opposite corners of the rectangularly shaped body portion thereof and which are bent back over the edges of the support 140 to secure contact member 147 to the support 140 and to provide a pair of conductive paths between the top and bottom thereof. A bottom contact member 149, which is secured to the inner wall of the housing cover 108, protrudes into the housing intermediate the members 114, 116 beneath the member 142 and has an upwardly self-biased leaf spring portion 150 extending through a control slot 154 in member 142, thereby to provide a sliding contact with the bottom surface of the contact 147. The contact member is conveniently secured to the housing cover 108 by means of a conductive rivet which additionally secures the terminal lug 153 to the outer surface of the cover 108 and provides a conductive path between the lug 153 and the contact 149. The contacts 149 and 147 correspond in operation to the pivoted shunt 68 in the embodiment of Fig. 1 and may be connected to the automotive vehicle battery through the terminal lug 153.

A low beam filament leaf spring contact member 156 and a corresponding terminal lug 157 (Fig. 9) are rivetted to the cover 108 in the contact 149. The contact 156 depends within the switch housing above the slidable support 140 and is self-biased against the support 140 at the forward intermediate portion thereof. The contact portion 156a of the contact 156 is offturned, thereby to contact only a relatively small portion of the support 140 such that when the support is in the full left position (solenoid 110 being actuated), contact 156 is pressed against the tab 147b whereas when the support 140 is in the full right position (solenoid 111 being actuated), the conductive path between contact 156 and tab 146b is broken. A high beam filament leaf spring contact member 158 and corresponding terminal lug 159 are similarly riveted to the housing cover 108. The contact 158 depends within the housing above the slidable support 140 and is provided with an offturned contact portion 158a which is self-biased against the rearward intermediate portion of the support 140. The contact portion 158a is similar to the contact portion 156a and only bears against the contact tab 147a when the slidable support 140 is in the full right position (solenoid 111 being energized). The switching apparatus 100 as thus far described may be used to switch current from the automotive vehicle battery to one set of headlight filaments in response to the energization of solenoid 110 and to another set of headlight filaments in response to the energization of solenoid 111.

In order to enable manual control of the position of the slidable contact support member 140 with respect to the contact members 156 and 158 irrespective of the condition of the automatic system, an integral upstanding ear 166 is centrally located on the slidable support 140 and is provided with an elongated aperture 168. A force transmitting bifurcated toggle member 170 is provided with elongated slots in the downwardly extending tines thereof and is attached to the ear 166 by means of swing pivot member 172 which is mounted for pivotal movement about its ends in apertures provided in the cover member 108 and in the cross member 119. The upstanding portion of the toggle 170 is covered by means of a resilient member 174 which is adapted to be biased against one or the other of channel defining members 176 and 177 which extend downwardly and forwardly from the upper and rear walls of the housing by means of an overcenter spring 178 which is pivotally mounted at its ends in apertures in the cover 108 and in the cross member 119. The apertures in which the spring 178 is mounted are positioned directly below the apertures in which the swing pivot 172 is mounted.

In order to manually position the slidable support 140 with respect to the high and low beam contacts 156 and 158, a downward force is exerted on the toggle 170 by means of a foot actuated plunger 180 which extends through an aperture 185 in the top of the switch housing and is biased by a coiled compression spring 181 in an upward position against the stop formed by the toggle actuating member 188 abutting against the bottom surface of the top wall of the switch housing. A conventional cover button 184 is secured as by rivetting to the top of the plunger 180 and member 188 is secured to the plunger 180 by the action of a spring plate 189 which is riveted to member 188 and adapted to be received along one of its edges in an annular recess 180a provided near the lower end of the plunger 180. A cylindrically shaped plunger housing 182 is secured to the top of the switch housing and adapted to telescope within the button 184 during manual actuation of the switch 100. The forward end 190 of the toggle actuating member 188 is offturned at 188a toward the bottom of the switch 100 and relieves the stress on the ear 166 by preventing forward stress on the toggle when the plunger is actuated so as to depress the toggle 170.

When the slidable support 140 is in the full left position as illustrated in Fig. 2, a downward force on the button 184 and consequently the toggle actuating member 188 is resolved into a downward vertical force and a rightwardly directed lateral force on the swing pivot and consequently on the ear 166 which forces the slidable support member 140 to the right such that the contact member 158 makes with the tab 147a to connect the terminal lug 157 with the terminal lug 159. As the support 140 is forced to the right, by the depression of the plunger 180, the swing pivot 172 is lowered in the slotted aperture 168 in the ear 166. In order to prevent the ends of the tines of the toggle 170 from bearing against the top of support 140 during this condition of operation, a pair of slots 189 and 190 are machined on opposite sides of the ear 166.

Reference is directed to the diagrammatic illustration of Figs. 11a and 11b for a better understanding of the operation of the toggle 170 and the offcenter spring 178 for forcing the support 140 to the unoccupied position in response to a downward force exerted on the toggle 170. In Fig. 11a, the toggle 170 is shown in solid lines occupying its normal position when the support 140 is in the full left postion and in dotted lines for the support 140 in the full right position. Fig. 11b shows the toggle 170 in an intermediate position during movement of the support 140 from one postion to the other.

Referring to Fig. 11a it will be observed that when the support 140 is in the full left position, the spring 178 exerts a force on the toggle 170 in a direction whereby to pivot it in a counterclockwise direction about the pivot point 170a thereof. When the support 140 is in the full right position, the spring 178 exerts a force on the toggle 170 in a direction whereby to pivot it in a clockwise direction about the pivot point 170a thereof. Referring to Fig. 11b it may be observed that when the toggle 170 is in an upright position and the pivot point 170a is aligned with the spring and swing pivot support apertures, an upwardly directed vertical force is exerted by the spring 178 on the toggle 170 and no movement is effected thereby. When, however, the pivot point 170a is moved to the right of the straight line path between the support apertures, the spring 178 exerts a clockwise force which is partially resolved into a lateral force on the toggle 170 which drives the slidable contact support 140 to the full right position. Similarly, when the pivot point 170a is moved to the left of the straight line between the support apertures, the spring 178 exerts a counterclockwise force which is partially resolved into a lateral force on the toggle 170 which forces the slidable support 140 to the full left position. The overcenter spring and swing pivot arrangement thereby assures the proper positioning of the support 140 even when the plunger 180 is not fully depressed and also positions the toggle 170 such that the succeeding actuation of the plunger 180 moves the support to the unoccupied position. In addition, the snap action securely positions the support 140 to prevent movement thereof due to sudden jars and continued vibration of the switch mechanism by the natural vibrations of the automotive vehicle as it is driven over rough terrain.

In order to deenergize the solenoids 110 and 111 when the foot operated plunger 180 is actuated there is provided a switch means connected in the ground circuit of the solenoids 110, 111. This switch comprises a contact button 200 which is conveniently attached to the rear wall of the housing 102 by means of an upstanding conductive contact support member 202. In this embodiment, the body portion 102 of the switch housing is constructed of metal and is attached to the metallic body of the automotive vehicle to complete the path between the contact button 200 and ground. Another contact button 204 is arranged to coact with the first contact 200 and is mounted on a conductive leaf spring 206 which is supported on an insulating terminal block 208 by means of a screw 209. The block 208 is attached to the rear wall of the housing 102 by means of a threaded screw 210, and a lead 212 (only partially shown), which completes the ground circuit of the solenoids 110, 111, is soldered to the spring 206. A rod-like actuating plunger 214 is constructed of an insulating material and is mounted for slidable movement in a bearing block 216 which is attached to the rear wall of the housing 100. The rearward portion of the toggle actuating member 180 extends downwardly a substantial distance along the rear wall of the switch housing 102 between the channel members 176, 177. The channel members 176, 177 in addition to acting as stops for purposes of resolving the downward force on the toggle 170, also define a guide path for directing the movement of the actuating member 180. The downwardly extending rearward portion of the toggle actuating member 180 is adapted to ride on a rail 218 which extends vertically along the rearward wall of the housing 102 at the center thereof. A plunger actuating member 220 having an off-turn portion 222 for coaction with the end of the plunger 214 is mounted on the member 188 for movement therewith such that during actuation of the plunger 180 the switch actuating plunger 214 is forced against the spring contact arm 206 to break the conductive path between the contacts 200 and 204. The plunger actuating member 220 is so located on the toggle actuating member 188 that conduction between the contact buttons 200, 204 is broken before the slidable support 140 is moved to a new position in response to the downward force on the toggle 170. As a result, there is no force exerted on the slidable support 140 by the control solenoids 110, 111 to counteract or oppose the mechanical force exerted thereon by the member 188.

In order to alternately open and close the control solenoid energization circuits upon successive actuations of the foot-operated plunger 180, the switch including the contacts 200, 204 is employed. As hereinbefore shown, when the plunger is in the fully released position (Fig. 4) the plunger 214 is released and the solenoid ground circuit is complete. When the plunger is partially actuated, however, the plunger 214 is actuated and the solenoid ground circuit is broken (Fig. 8), but the toggle 170 is not yet actuated. Therefore, the present invention employs an oppositely bifurcated detent 228 which is rotatably supported near the lower end of the downwardly extending portion of the toggle actuating member 188 which is adapted to freely pass upwardly past a forwardly extending shoulder 229 of the channel member 176 when the inner surfaces of the bifurcated portions of the detent 228 do not engage the shoulder 229 as the plunger 180 is released. When, however, the detent 228 is below the extending portion 229 of channel member 176 and the inner surfaces of the bifurcated portions do engage the shoulder 229 upon the release of the plunger 180, the spring 181 forces the toggle actuating member upward such that the rightwardly extending tine of the detent 228 catches on the shoulder 229 to jam the plunger 180 in a partial downward position (Fig. 8). In this position, the solenoid ground circuit is held open by the force exerted by the plunger 214 on the contact arm 206.

The next succeeding depression of the plunger 180 forces the detent 228 against an upwardly extending camming finger 226 which is offset from the pivot point of the detent thereby to rotate the detent 228 in a clockwise direction by such an amount that upon the release of the plunger 180 the shoulder 229 does not engage the bifurcated ends of the detent 228 and the plunger 180 is forced by the spring 181 to the fully released position. The solenoid ground circuit is thus completed and the system is returned to the automatic condition.

On the next following actuation of the plunger 180, the lower bifurcated end of the detent 228 engages the camming finger 226 (Fig. 6) and is thereby rotated by such an amount that upon the release of the plunger 180, the open bifurcated end of the detent 228 engages the shoulder 229, is jammed thereby, and the system is again in the manually operating condition. The switching mechanism of Figures 2 to 11 inclusive, is described and specifically claimed in our divisional application, Serial No. 789,770; filed January 26, 1959.

While there have been described what are at present considered to be the preferred embodiments of the invention, it will be understood that various modifications may be made therein which are within the true spirit and scope of the invention as definted in the appended claims.

What is claimed as new and desired to be secured by Letters Patent of the United States is:

1. A headlight system for automobiles comprising, a high beam connection; a low beam connection; a battery connection; a low beam controlling solenoid; a high beam controlling solenoid; a single pole double throw switch, selectively acting to connect said low beam connection to said battery connection when said low beam solenoid is energized, said switch selectively acting also, to connect said high beam connection to said battery when said high beam solenoid is energized; a light sensitive device; a sensitive relay under control of said light sensitive device for selectively controlling current flow through said solenoids, said relay acting to selectively energize said low beam controlling solenoid when light impinges upon said light sensitive device and acting to selectively energize said high beam controlling solenoid when light is absent from said light sensitive device; and, a manually operated foot switch assembly including a plunger, a pair of contacts and a cam mechanism; said contacts being in circuit with said sensitive relay, the arrangement being such that with each forward movement of said plunger said single pole double throw switch is moved to its other position, and, with every other actuation of said plunger said cam mechanism serves to hold said contacts of said foot switch assembly open, thereby, in said open position, said contacts of said assembly disable said sensitive relay from controlling the energization of said solenoids.

2. Apparatus as claimed in claim 1 characterized by the fact that said sensitive relay includes a coil in the output circuit of an amplifier and that the light sensitive device controls a voltage applied to the input circuit of said amplifier.

3. Apparatus as claimed in claim 2 characterized by the fact that said sensitive relay carries an auxiliary contact, said contact controlling a circuit so as to increase the sensitivity of said amplifier when said contact is opened by said sensitive relay and to decrease the sensitivity of said amplifier when said last mentioned auxiliary contact is closed.

References Cited in the file of this patent

UNITED STATES PATENTS

| | | |
|---|---|---|
| 1,948,896 | Wright | Feb. 27, 1934 |
| 1,997,209 | Douglas | Apr. 9, 1935 |
| 2,021,041 | Altamura | Nov. 12, 1935 |
| 2,493,307 | Moore et al. | Jan. 3, 1950 |
| 2,558,969 | Le Croy | July 3, 1951 |
| 2,639,339 | Franck | May 19, 1953 |
| 2,684,418 | Kock | July 20, 1954 |
| 2,686,277 | Bordewieck et al. | Aug. 10, 1954 |
| 2,708,371 | Pashby | May 17, 1955 |